United States Patent [19]

Tatsumi et al.

[11] 4,377,762

[45] Mar. 22, 1983

[54] ROTARY ELECTRIC MACHINE ROTOR AND A METHOD OF MANUFACTURING THE SAME

[75] Inventors: Hideo Tatsumi; Hisanobu Kanamaru; Akira Tohkairin; Moisei Okabe; Ryoji Kasama, all of Ibaraki, Japan

[73] Assignee: Hitachi, Ltd., Tokyo, Japan

[21] Appl. No.: 223,151

[22] Filed: Jan. 7, 1981

Related U.S. Application Data

[63] Continuation-in-part of Ser. No. 125,094, Feb. 27, 1980.

[30] Foreign Application Priority Data

Jan. 7, 1980 [JP] Japan ................................. 55-114

[51] Int. Cl.³ ............................................. H02K 15/02
[52] U.S. Cl. ......................................... 310/42; 29/29; 29/525; 310/259; 310/261
[58] Field of Search ................. 310/42, 168, 257, 268, 310/269, 259, 261; 29/432, 520, 525, 596, 598; 403/359, 282

[56] References Cited

U.S. PATENT DOCUMENTS

| | | | |
|---|---|---|---|
| 3,603,825 | 9/1971 | Sheridan | 310/194 |
| 3,650,022 | 3/1972 | Stone | 310/42 |
| 3,699,637 | 10/1972 | Rosiek | 29/520 |
| 3,707,038 | 12/1972 | Hallerback | 310/42 |
| 3,872,578 | 3/1975 | Ullom | 403/282 |
| 3,909,642 | 9/1975 | Busian | 310/42 |
| 4,028,568 | 6/1977 | Tatsumi et al. | 310/42 |

OTHER PUBLICATIONS

Rich, L. M., "15 Ways to Fasten Gears to Shafts", Product Engineering, May 30, '60.

Primary Examiner—J. D. Miller
Assistant Examiner—D. L. Rebsch
Attorney, Agent, or Firm—Antonelli, Terry & Wands

[57] ABSTRACT

A rotary electric machine rotor comprises a rotary shaft which is formed with a plurality of protuberances projecting beyond a basic circle and extending in a lengthwise direction, and a core which is made of a plurality of core segments smaller in deformation resistance than that of the rotary shaft. The rotary shaft is plastically pressed into the core and has an annular groove formed at a position of the rotary shaft somewhat inward of an end face of the core. The core is plastically deformed and a part of the core is filled fully in the annular groove while axially pressing the core.

7 Claims, 16 Drawing Figures

ROTARY ELECTRIC MACHINE ROTOR AND A METHOD OF MANUFACTURING THE SAME

This application is a continuation-in-part of co-pending U.S. patent application Ser. No. 125,094, filed Feb. 27, 1980.

This invention relates to a rotor of a rotary electric machine and a method for manufacturing the same, and more particularly to a rotor suited to a rotary electric machine such as an AC generator for automobiles, which rotor comprises a rotary shaft and a plurality of cores connected to the rotary shaft, and also to a method of manufacturing the same.

In methods of fastening core members and a rotary shaft which constitute the rotor of a rotary electric machine, there has heretofore been known a method wherein especially to attain a great fastening force, the rotary shaft is provided with knurls, which are pressed into the core members. With this method, however, in case of the press-in, a great axial force (3.5–5 tons) acts on the rotary shaft, and a bending of the rotary shaft is liable to occur. This bending causes shortening the life of the rotary electric machine and noise generation. In addition, the core members do not intrude sufficiently into the knurls, so that a great mechanical coupling force (torque) is not attained. Further, there is the disadvantage that the drag against an axial stress, i.e., the shear fracture force is low, which poses such a problem that the core members vibrate in the axial direction to generate magnetic vibration noise.

In U.S. Pat. No. 3,603,825, a rotor construction is provided wherein a coupling between a rotary shaft and rotor segments is accomplished by providing serrations on at least a portion of the shaft which are adapted to receive and secure the respective elements of the rotor.

As another fastening method, there has been known a method wherein the rotary shaft is knurled similarly to the aforecited method, and further, annular grooves are provided in positions corresponding to the end faces of rotor cores, the rotor cores and a yoke are pressed into the rotary shaft, and the end parts of the rotor cores are thereafter subjected to coining so that annular corners defined by the side faces and hole face of the rotor cores are crushed into the annular grooves, thereby intending to prevent the shaft from coming off in the axial direction. According to this method, the drag against the axial stress is somewhat improved over the method stated previously, but it is still insufficient.

An object of this invention is to provide, in fastening of core members of a rotary electric machine to a rotary shaft, a fastening structure and a fastened method according to which the rotary shaft is not bent, mechanical coupling forces are great in a rotating direction and in an axial direction, and the core members are in a tight contact with each other.

A characterizing feature of this invention consists in a construction comprising a rotary shaft which is formed with a plurality of protuberances extending in a lengthwise direction, and members including rotor cores which are made of a material smaller in deformation resistance than that of said rotary shaft and which are plastically pressed into said rotary shaft to lie in close contact therewith, an annular groove being provided in a position of said rotary shaft somewhat inward of an end face of at least one of the members, after the insertion of the rotary shaft into the core members a part of said one of the core members being fully filled and snugly fitted in said groove with said core members being axially prestressed.

Axial coupling force between the rotary shaft and the core members are attained mainly in the snugly fitted parts, and therewith, the rotary shaft does not bend due to a pressure thereof and a great torque is attained.

These and other objects and features of this invention will be understood from the following description referring to the accompanying drawings, wherein.

Figure 12:
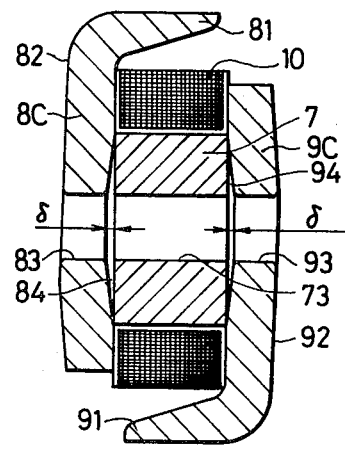
Figure 13:
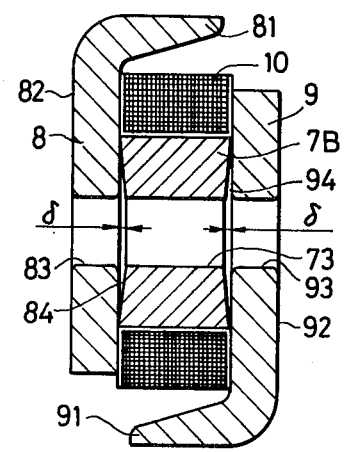
Figure 16:
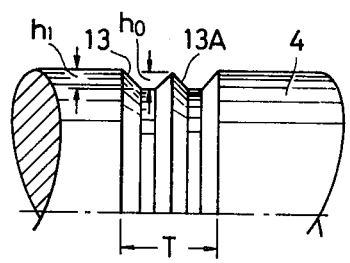
Figure 14:
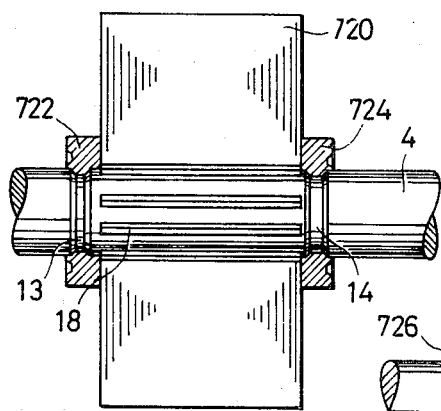
Figure 15:
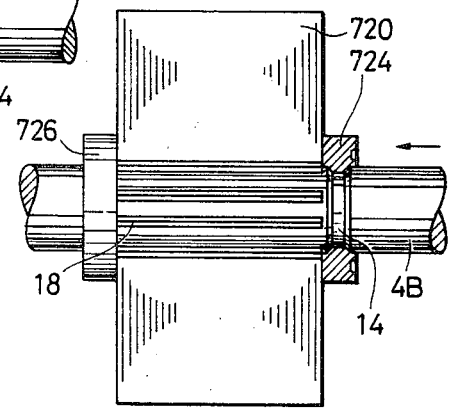

FIGS. 12 and 13 each are a sectional view of core members according to another embodiment of the invention;

FIGS. 14 and 15 each are a sectional view of a motor rotor according to another embodiment of the invention; and FIG. 16 is a sectional view of a part of a rotary shaft.

Hereunder, embodiments of this invention will be described with reference to the drawings.

Figure 1:
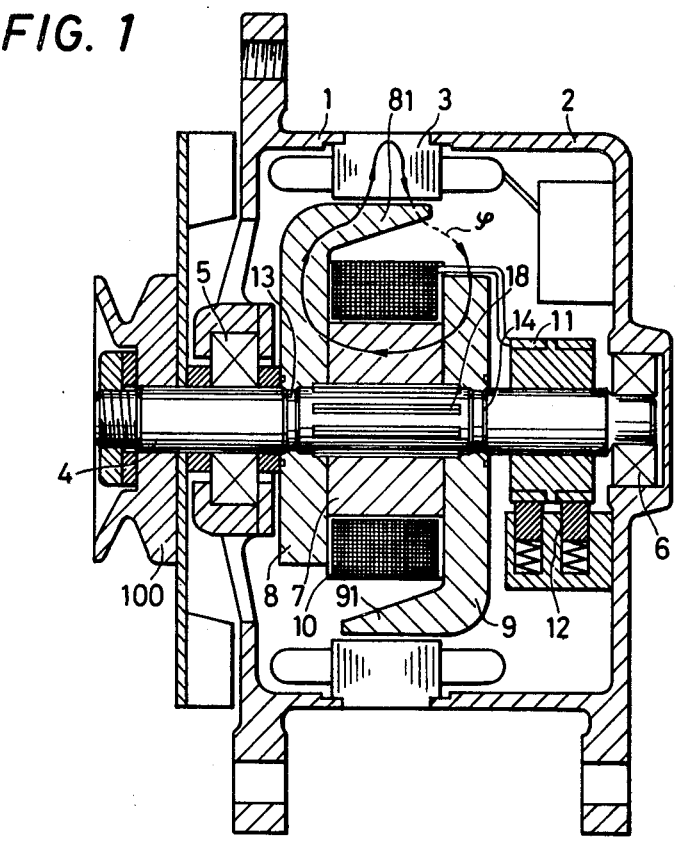
FIG. 1 is a vertical sectional view of a rotating-field type AC generator for automobiles according to an embodiment of this invention.

FIG. 1 shows a vertical section of a rotating-field type AC generator for automobiles according to an embodiment of this invention.

In the figure, numerals 1 and 2 designate a pair of housings, between which a stator core 3 is held. Numeral 4 designates a rotary shaft which is carried by the housings 1 and 2 through bearings 5 and 6. A yoke 7 and rotor cores 8 and 9, which constitute the core portion of a rotor, are fastened to the rotary shaft 4. Pawls 81 and 91 are formed in the outer peripheral parts of the rotor cores 8 and 9 in a manner to enter the opposite pawls. The material of the rotor cores 8 and 9 needs to be smaller in deformation resistance than the material of the rotary shaft 4. In the embodiment, the rotary shaft 4 is of carbon steel containing 45% of carbon (S45C), and both the rotor cores 8, 9 and the yoke 7 are of low-carbon steel or soft steel. A field winding 10 is wound round the yoke 7, and electric current is externally fed through a slip ring 11 as well as a brush 12. $\phi$ indicates a magnetic flux. The rotor is rotated against the magnetic force by mechanical force applied to a pulley 100 provided on the rotary shaft 4.

Figure 2:
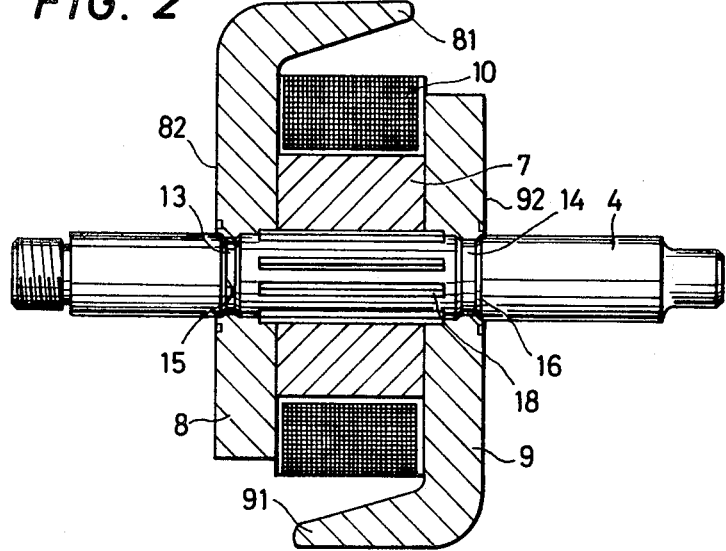
FIG. 2 is a detailed vertical sectional view of the rotor cores in FIG. 1.

As shown in FIG. 2, the rotary shaft 4 is provided with grooves 13 and 14 in positions near the end faces 82 and 92 of the rotor cores 8 and 9. The rotary shaft 4 is also provided with proturberances 18 which project beyond a reference circle (outside diameter) with circumferential intervals therebetween and which extend in the longitudinal direction.

Figure 3:
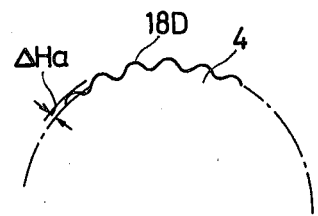
FIG. 3 is a sectional view of a rotary shaft.

The rotary shaft 4, may employ protuberances or knurls 18D formed by a knurling method as shown in FIG. 3. In this case, it is preferable that the height $\Delta$ Ha of the protuberances or knurls 18D from the reference circle is 0.065~0.085 mm. The rotary shaft 4 may be pressed in the rotor cores with minimized bending for example, the bending after press-in of the rotary shaft 4 thus formed has a value of about $\frac{1}{8}$ in comparison with the bending after press-in based on the knurling press-in method which has hitherto been known and in which the height of the projection from the reference circle in 0.15~0.20 mm. Concretely, the former is 0.003-0.01 mm, whereas the latter is 0.025-0.06 mm. A shaft having such height of the projection formed according to the knurling press-in method renders the press-in load double or more as compared with the method of this invention.

Figure 4:
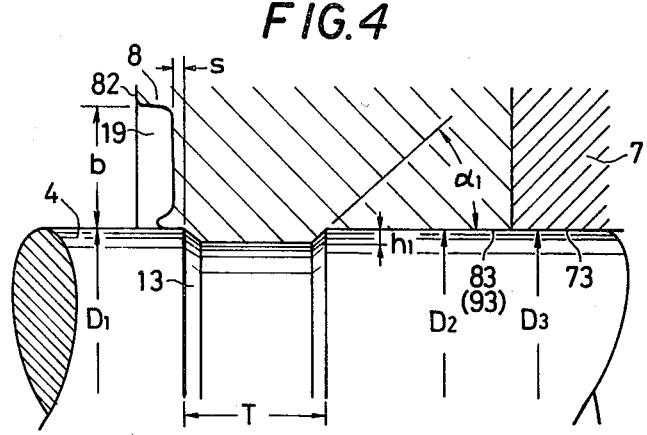
FIG. 4 is a sectional view of fastened rotor cores and the rotary shaft.

Referring now to FIG. 4, the details of the vicinity of the groove 13 will be described. Illustration of the protuberances 18 of the rotary shaft 4 are omitted from FIG. 4.

The diameter $D_1$ of the rotary shaft 4 is equal to or somewhat smaller than the diameters $D_2$ and $D_3$ of apertures 73 and 83, 93 of the yoke 7 and rotor cores 8, 9. Desirably, they are in the relation of clearance fit between the apertures and the reference circle of the rotary shaft 4. Although the relation, of the snug fit, may well be employed depending on materials and uses, the relative in which a great press-in force is required in case of inserting the rotary shaft 4 into the apertures 73, 83, 93 forms a factor for the bending of the rotary shaft 4 and is therefore unfavorable.

The annular groove 13 has a width T with the depth of the groove 13 being suitably selected in accordance with the shear strength required for the coupling portion in an axial direction. Preferably, the groove 13 has a depth $h_1$ of 0.2 to 1.0 mm and an angle of inclination $\alpha_1$ for its sloped sides which face into the groove 13, of between 30° to 70°, and preferably about 45°. If the depth $h_1$ of the groove 13 is excessively increased, it has been found that such an increase does not significantly contribute to an increase in the coupling power between the members.

Figure 5:
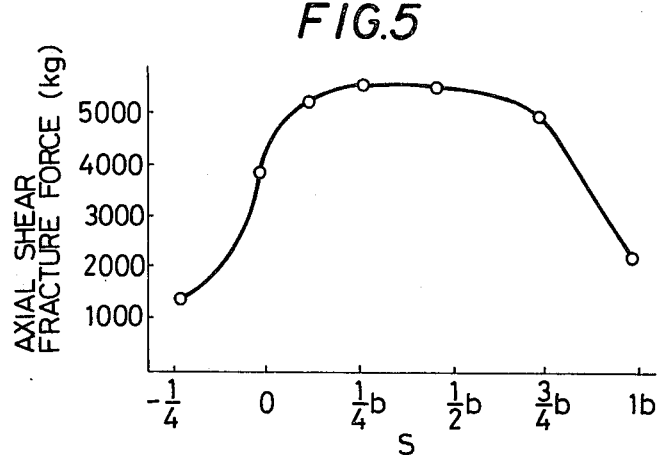
FIG. 5 is an explanatory view concerning the positions of grooves to be similarly formed in the rotary shaft.

In case of letting s denote the distance from the bottom of a recess 19 in the rotor-core end face 82 to the groove 13 and letting b denote the width from the outer periphery of the rotary shaft 4 to the outer peripheral end of the recess 19, a ratio s/b has a desirable range. FIG. 5 shows the result of the relationship between the ratio s/b and the axial shear fracture force as has been experimentally obtained ($D_1=D_2=D_3=17$ mm, b=2.5 mm, groove width T=3.0 mm, $h_1=0.35$ mm $\alpha_1=45°$, rotor core wall thickness: 10 mm). When the ratio s/b is great, the frictional loss in the case where a part of the rotor core flows due to the plastic working increases, a part of the rotor core cannot be sufficiently fitted into the groove and a great axial shear force is not attained. Conversely, when the bottom of the recess 19 comes inside the end of the groove 13 or 14, that is, when s lies on the minus side, a part of the rotor core fails to fill the groove and a great axial shear force cannot be attained. In practical use, the ratio s/b should desirably be made $0-\frac{3}{4}$. For example, in case where b is made approximately 2-3 mm in the generator shown in FIG. 1, s may be made approximately 0-2 mm.

Figure 6:
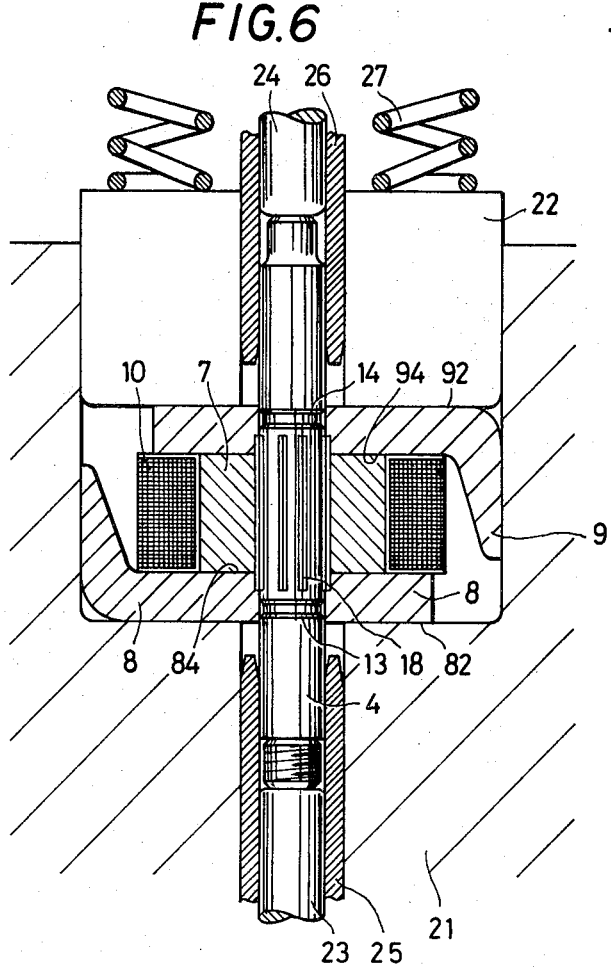
FIG. 6 is a view showing an example of a method of fabricating the rotor shown in FIG. 2.

Now, FIG. 6 show an example of a coupling process according to this invention.

Numeral 21 indicates a female mold, numeral 22 a male mold, numeral 23 a lower pressure pin, numeral 24 an upper pressure pin, numeral 25 a lower punch, and numeral 26 an upper punch.

In the coupling, first of all, the rotary shaft 4 is pressed into the hollows of the core members (yoke 7, rotor cores 8 and 9) under about 0.5-1.5 ton. The insertion of the rotary shaft 4, for example, is achieved by such a process that the male mold 22, the upper punch 26, and the pressure pin 24 are raised further from the positions illustrated in FIG. 6, the core members are inserted in the female mold 21, the lower portion of the rotary shaft 4 is inserted into the hollow parts of the core members, then the rotary shaft 4 is plastically pressed-in by the upper pressure pin 24 lowering while being guided by the upper and lower punches 26 and 25.

Subsequently, the rotor core 8, the yoke 7 and the rotor core 9 is subjected to a preload by a spring 27. Accordingly, the contact surfaces 84 and 94 between the respective rotor cores 8, 9 and yoke 7 become close contact states. The preload is made a magnitude at which a prestress $\sigma_o$ being deformation resistance $\sigma_1$ of the material is caused within the rotor cores 8 and 9. By way of example, the preload may be approximately 20-30 tons when the yoke 7 has an inside diameter of 17 mm and an outside diameter of 42 mm.

On the other hand, the rotary shaft 4 is held between the pressure pins 23 and 24 so that the grooves 13 and 14 may have a predetermined positional relationship with respect to the rotor cores 8 and 9.

Under this state, the end face 82 of the rotor core 8 is pressed by the lower punch 25 so as to cause a deformation stress $\sigma_2$ greater than the deformation resistance $\sigma_1$ and is brought into plastic flow, to permit a part of the rotor core to flow into the groove 13, whereby the rotor 8 and the rotary shaft 4 are coupled. The working is carried out in a cold condition.

In case where the inside and outside diameters of the yoke are 17 mm and 42 mm respectively, the applied pressure for the coupling based on the plastic deformation may be 20 tons or so.

The rotor core 8 is subjected to the prestress $\sigma_o$, and hence, at the pressure application by the lower punch 25, the rotor core 8 is checked from wholly stretching radially outwards and only its part close to the groove has the stress ($\sigma_2$) raised locally. Accordingly, the part of the rotor core 8 can be caused to flow into the entire groove efficiently.

Subsequently, the end face 92 of the rotor core 9 is similarly pressed by an upper punch 26, to couple this rotor core 9 and the rotary shaft 4.

According to the coupling method of the embodiment of this invention described above, when the rotary shaft 4 is pressed into a aperture of the yoke 7 and the rotor cores 8, 9, almost no force acts in the axial direction of the rotary shaft 4. In the knurling press-in method of the prior art wherein the height of the projections from the reference circle is 0.15~0.20 mm, a press-in force of 3.5 tons-5 tons has been required in case of the generator for automobiles, whereas according to the method of this invention, a force of 0.5-1.5 ton or less suffices. Accordingly, potential bending of the rotary shaft due to the press-in process is not a problem.

It is understood that the member of the rotor core 8 or 9 is in close contact with the protuberance 18D on the whole surface.

According to the coupling method embodying this invention, as shown in FIG. 4, the rotor cores 8 and 9 flow in the whole grooves 13 and 14, and hence, the axial shear fracture forces become great.

Table 1 lists the experimental results of coupling forces etc. on the coupling method of this invention shown in FIGS. 1 and 2 and the prior coupling method (B, C) (diameter $D_1$ of the rotary shaft 4=17 mm). In the prior coupling method (C), a rotary shaft is provided with knurls and pressed into the hollows of the core members, while in the prior coupling method (B), a rotary shaft is provided with knurls and annular grooves at both ends of the knurls, is pressed into the apertures of the core members, and then the corner parts of the core members corresponding to the grooves are crushed.

| | Coupling Methods | | |
|---|---|---|---|
| Items | (A) this invention | (B) prior art | (C) prior art |
| (1) Press-in force of Rotary Shaft | 0.5–1.5 tons | 3.5–4.5 tons | 4.0–5.0 tons |
| (2) Axial shear fracture force | 13–18 tons | 8–11 tons | 3.5–4.5 tons |
| (3) Bending of Rotary shaft | 0.003–0.01 mm | 0.025–0.06 mm | 0.025–0.06 mm |
| (4) Torque of Rotor core | 35–40 kg-m | 8–12 kg-m | 15–20 kg-m |

Now, according to the coupling method embodying this invention, the rotor cores are coupled to the rotary shaft in a state in which the preload is applied to the yoke and the rotor cores, and hence, axial forces remain between the contact surfaces of the yoke and the rotor cores even after the coupling. The residual axial force reaches 6–8 tons when the diameter of the rotary shaft 4 is 17 mm and the outside diameter of the yoke is 42 mm. In contrast, it is only 0–0.5 ton or so with the prior-art system (C) and only 0.5–1.5 tons or so with the prior-art system (B). This fact that the great residual axial forces are caused by the coupling method of the present invention renders very good the degree of close contact of the contact surfaces between the rotor cores and the yoke with a resulting enhancement in electrical output and a reduction in magnetic noise as are attendant upon a decrease in the magnetic reluctance.

Figure 7:
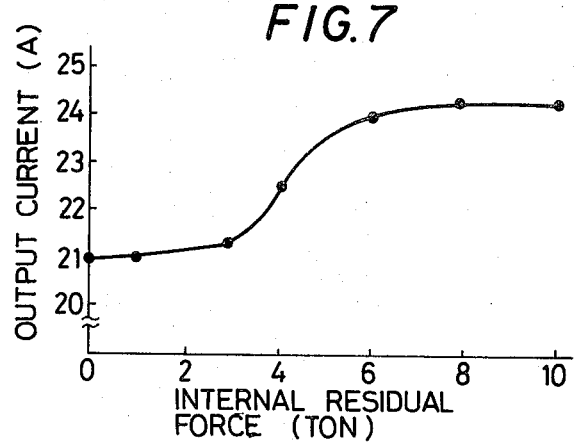
FIG. 7 is a diagram showing a relation between output current and internal residual force between a yoke and the cores.
Figure 8:
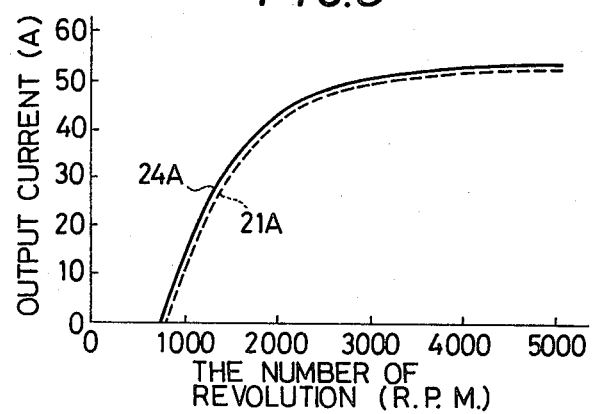
FIG. 8 is a diagram showing a relation between output current and the number of revolutions.
Figure 10:
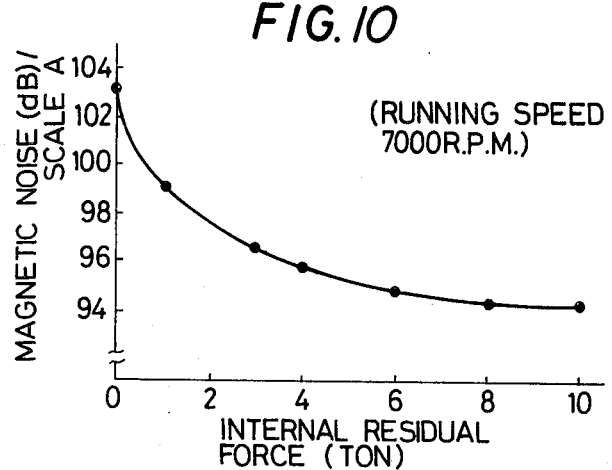
FIG. 10 is a diagram showing a relation between magnetic noise and internal residual force.

FIG. 7 shows the relationship between the output current and the internal residual force in the axial direction between the rotor core and the yoke. A machine used is of the type shown in FIG. 1, and it is rated at 5000 r.p.m. and 50 A. Under the conditions of the number of revolutions of 1250 r.p.m. and a voltage of 14 V, when the internal residual force lies in a range of small values of at most approximately 3 tons, the output current is 21 A, whereas when the internal residual force exceeds 6 tons, the output current rises to 24 A. That is, the output current increases 14% owing to merely the difference of the coupling methods. As shown in FIG. 10, this relationship holds in the entire varying range of the number of revolutions of an automobile engine. That is, according to the coupling method of this invention indicated by a solid line, the electrical output increases ten and several odds % as compared with that of the prior-art system indicated by a broken line.

Figure 9:
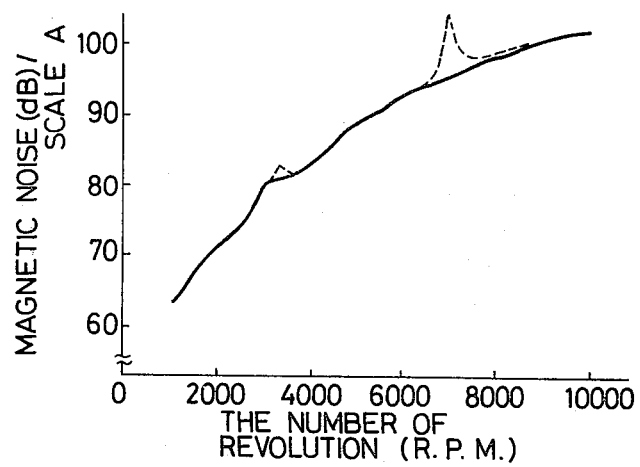
FIG. 9 is a diagram showing a relation between magnetic noise and the number of revolutions.

On the other hand, the relationship between the number of revolutions and the magnetic noise of the generator becomes as in FIG. 9. A broken line indicates a result obtained by the coupling method of the prior art (B), and the peak values of noise appear in the vicinities of 3300 r.p.m. and 7000 r.p.m. (103 dB). In contrast, according to the coupling method of this invention, such peak values do not appear as indicated by a solid line (95 dB at 7000 r.p.m.). This is because, as shown in FIG. 10, the magnetic noise decreases as the degrees of close contact between the contact surfaces of the rotor cores and the yoke rise. According to the coupling method of this invention, a noise reduction of about 8 dB (8%) has become possible in the vicinity of running speed 7000 r.p.m.

Figure 11:
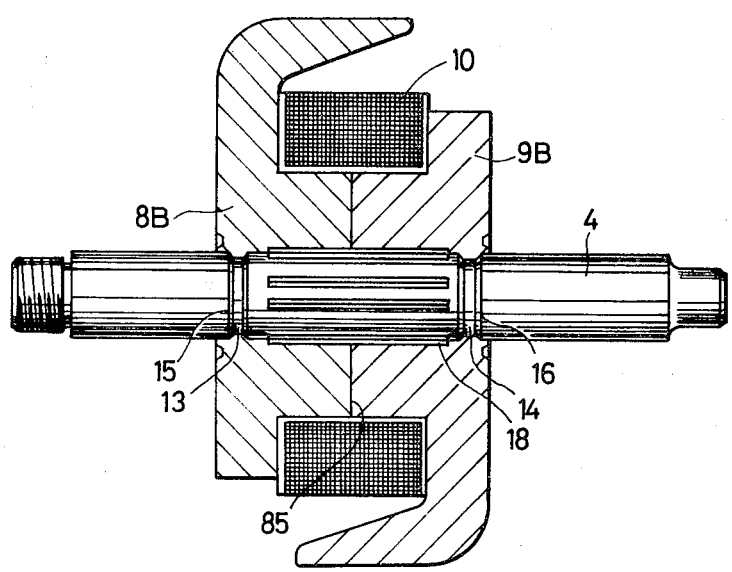
FIG. 11 is a sectional view of a rotor according to another embodiment of the invention.

Another embodiment of this invention shown in FIG. 11 concerns a rotor of the type in which a pair of rotor cores 8B and 9B serve also as a yoke. The pair of rotor cores 8B and 9B are mechanically rigidly secured to the rotary shaft 4 by the same method as in the embodiment illustrated in FIGS. 1 and 2. A great axial force remains between the contact surfaces 85 of the rotor cores 8B and 9B even after the coupling, so that excellent electrical characteristics are obtained and that magnetic noise lower.

Further, according to another embodiment of this invention shown in FIG. 12, rotor cores 8C and 9C are previously formed in a manner to protrude δ away from a yoke 7 in their hollow parts 83 and 93. δ is made 0.1–1.0 mm, desirably 0.2–0.8 mm.

When the rotor cores are thus protruded δ away from the yoke 7 in advance, the degrees of close contact between the contact surfaces 84 and 94 of the yoke 7 and the rotor cores 8C, 9C after the coupling can be enhanced still more.

This is effective especially in case where a material of low deformation resistance has been selected for the rotor cores 8C and 9C. For example, in is a case where low-carbon steel is employed for the rotor cores 8C and 9C and where annealing for improving magnetic characteristics is carried out to lower the deformation resistance. When the rotor cores 8C, 9C made of the material of low deformation resistance in this manner is subjected to a preload before the coupling, those outside parts of the rotor cores 8C, 9C which do not abut on the yoke 7 are deformed, and the contact pressures between the contact surfaces with the yoke 7 do not rise sufficiently.

Instead of protruding the rotor core side away from a yoke 8, the yoke side may well be recessed δ away from the rotor cores 8, 9 in advance as illustrated in FIG. 13.

The protruded surface or the recessed surface may be formed of a flat surface which defines a prescribed inclination angle relative to a plane orthogonal to the axis thereof. Both the yoke 7B and the rotor cores 8, 9 may well be formed with the protruded surfaces and the recessed surfaces.

Both the contact surfaces 85 of the two rotor cores 8B, 9B in the embodiment shown in FIG. 11 may well be inclined.

Although all the embodiments above described are the examples of generators, this invention can of course be applied to electric motors of similar constructions.

FIG. 14 shows an example in which this invention is applied to the coupling between the rotor core and the rotary shaft of an electric motor. A rotary shaft 4 formed with protuberances 18 is pressed into a hollow part of a laminated core 720, and while applying pressures to the laminated core 720 from both the ends thereof, parts of annular stoppers 722 and 724 are caused to flow owing to plastic deformation into grooves 13 and 14 formed somewhat outwardly of both the ends of the core, whereby the laminated core 720 is coupled to the rotary shaft 4.

In an embodiment shown in FIG. 15, a flange 726 is formed integrally with a rotary shaft 4B, a laminated core 720 is pressed on the rotary shaft 4B in the direction of arrow, and an annular stopper 724 is subsequently deformed plastically so as to cause its part to flow into a groove 14, whereby the rotary shaft 4B and the laminated core 720 are coupled.

The core member (or armature) may well be in a shape other than the shapes of the rotor cores and the yokes shown in the embodiments. However, unless among the constituent pieces of the core member, the constituents located near both the ends have a certain rigidity as the rotor cores illustrated in the embodiments, the effects based on the coupling with the preload applied are not satisfactorily attained.

Regarding the shape of the groove 13, a plurality of ring-like protuberances 13A may well be provided in a ring-like groove as illustrated in FIG. 16. In this case, preferably the depth $h_1$ of the groove 13 and the height $h_o$ of the protuberance 13A lie roughly in the following relationship:

$$\frac{h_1}{2} = h_o = \frac{7}{8} h_1.$$

As set forth above, according to this invention, in fastening a core member and a rotary shaft, an annular groove is provided in a position of the rotary shaft corresponding to a position somewhat inward of the end face of the core member, and a part of the core member is snugly fitted into the groove by pressing the end face thereof, so that the rotary shaft and the core member are rigidly coupled. Further, under the state under which preloads are applied between a yoke and rotor cores, the rotor cores are coupled to the rotary shaft, so that axial forces remain between the contact surfaces of the yoke and the rotor cores even after the coupling, resulting in the effects of enhancement electrical outputs and reduction in magnetic noise. Also, in a press-in process, a press-in load may be ½ or less of that in the knurling press-in method having hitherto been known, and the bending of the rotary shaft is as small as about ⅛.

What is claimed is:

1. A rotor of a rotary electric machine comprising:
   a rotary shaft having a circumferential surface with at least one annular groove therein and a plurality of axially extending protuberances thereon; and
   a rotor core having an aperture for receiving said rotary shaft therein;
   wherein the rotary shaft is press-fit within said aperture of the rotor core with said annular groove being positioned slightly inside of an end face of said rotary core, and wherein a portion of said end face near said shaft has been cold-pressed, while a preload has been exerted on the remaining portion of said end face, in a manner such that the rotor core and rotary shaft are fastened together by a portion of said rotor core having been plastically deformed into said annular groove in the rotary shaft filling same, and a recessed portion is formed in said end face which satisfies the following relationship relative to the annular groove: $0 \leq s/b \leq \frac{3}{4}$, wherein s denotes the distance from the bottom of the recessed portion in the end face to the groove, and b denotes the width from the circumference of said rotary shaft to the outer circumferential end of the recessed portion.

2. A rotor according to claim 1, wherein said rotor core comprises a pair of rotor core members and a yoke tightly sandwiched therebetween.

3. A rotor according to claim 1, wherein the rotor core comprises a pair of hollow stoppers and a yoke tightly sandwiched therebetween.

4. A rotor according to claim 1, wherein said protuberances have a height of 0.065~0.085/2 mm.

5. A rotor according to claim 4, wherein the depth of said annular groove is 0.2 mm to 1.0 mm.

6. A rotor according to claim 1, wherein said shaft is provided with a pair of said annular grooves and said protuberances are located therebetween.

7. A rotor according to claim 2, wherein said yoke tapers radially inwardly in thickness.

* * * * *